(12) United States Patent
Park et al.

(10) Patent No.: US 12,544,937 B2
(45) Date of Patent: Feb. 10, 2026

(54) ROBOTIC HAND SYSTEM AND METHOD FOR CONTROLLING ROBOTIC HAND

(71) Applicant: KOREA ADVANCED INSTITUTE OF SCIENCE AND TECHNOLOGY, Daejeon (KR)

(72) Inventors: Hyung Soon Park, Daejeon (KR); Si Hwan Heo, Daejeon (KR)

(73) Assignee: KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 467 days.

(21) Appl. No.: 17/622,160

(22) PCT Filed: Nov. 26, 2021

(86) PCT No.: PCT/KR2021/017622
§ 371 (c)(1),
(2) Date: Apr. 5, 2022

(87) PCT Pub. No.: WO2023/068440
PCT Pub. Date: Apr. 27, 2023

(65) Prior Publication Data
US 2023/0256618 A1    Aug. 17, 2023

(30) Foreign Application Priority Data
Oct. 20, 2021    (KR) .................. 10-2021-0140212

(51) Int. Cl.
*B25J 15/00*    (2006.01)
*A61F 2/58*    (2006.01)
(Continued)

(52) U.S. Cl.
CPC ........... *B25J 15/0009* (2013.01); *B25J 9/161* (2013.01); *B25J 9/163* (2013.01); *B25J 9/1664* (2013.01);
(Continued)

(58) Field of Classification Search
None
See application file for complete search history.

(56) References Cited

U.S. PATENT DOCUMENTS 10,682,774 B2    6/2020    Bingham et al.
12,099,645 B2 *  9/2024    Andersen .............. G06F 3/0444
(Continued)

FOREIGN PATENT DOCUMENTS

EP    2813194 A1    12/2014
EP    2642953 B1    3/2016
(Continued)

OTHER PUBLICATIONS

"Szecowka et al., "Hardware Approach to Artificial Hand Control Based on Selected DFT Points of Myopotential Signals", EUROCAST, p. 571-578" (Year: 2009).*

(Continued)

*Primary Examiner* — Jason Holloway
*Assistant Examiner* — Atticus A Cameron
(74) *Attorney, Agent, or Firm* — Kolitch Romano Dascenzo Gates LLC

(57) ABSTRACT

Provided are a robotic hand system and a method for controlling a robotic hand. A robotic hand system operated by a user according to an example embodiment, the robotic hand system may include a robotic hand configured to grip a target object, a first sensor unit disposed on the robotic hand, the first sensor unit configured to detect a real-time posture of the robotic hand, a second sensor unit disposed on the robotic hand, the second sensor unit configured to detect three-dimensional surface information of the target object that appears based on the robotic hand, and a processor configured to infer, based on sensing information of the first sensor unit and the second sensor unit, a motion of the robotic hand conforming to an intention of the user, and (Continued)

operate the robotic hand according to the inferred motion. The robotic hand may include a finger module including a plurality of frames, and one or more joint portions connected to the plurality of frames, the one or more joint portions configured to change positions of the plurality of frames.

20 Claims, 10 Drawing Sheets

(51) Int. Cl.
    *A61F 2/70*     (2006.01)
    *B25J 9/16*     (2006.01)
    *B25J 13/08*     (2006.01)
    *B25J 15/10*     (2006.01)

(52) U.S. Cl.
    CPC ........... *B25J 13/084* (2013.01); *B25J 13/089* (2013.01); *B25J 15/10* (2013.01)

(56) References Cited

U.S. PATENT DOCUMENTS

| | | | |
|---|---|---|---|
| 2019/0176326 A1 | 6/2019 | Bingham | |
| 2019/0374352 A1 | 12/2019 | Van Der Merwe et al. | |
| 2021/0122045 A1* | 4/2021 | Handa | B25J 13/084 |
| 2022/0314449 A1* | 10/2022 | Hosomi | B25J 9/1689 |
| 2024/0149458 A1* | 5/2024 | Watabe | B25J 9/1689 |

FOREIGN PATENT DOCUMENTS

| | | |
|---|---|---|
| JP | 2019093461 A | 6/2019 |
| KR | 1020090118153 A | 11/2009 |
| KR | 1020200063353 A | 6/2020 |
| KR | 1020200097572 A | 8/2020 |
| WO | WO2019055848 A1 | 3/2019 |
| WO | WO2019234706 A1 | 12/2019 |
| WO | WO2021178914 A1 | 9/2021 |

OTHER PUBLICATIONS

Finn, Chelsea, et al.; "Deep Visual Foresight for Planning Robot Motion"; obtained from IIEEE International Conference on Robotics and Automation (ICRA), Jun. 2017.

Hsiao, Kaijen, et al.; "Reactive Grasping Using Optical Proximity Sensors"; obtained from IEEE International Conference on Robotics and Automation (ICRA), May 2009.

Korean Society of Mechanical Engineers; "Shared autonomy for the prosthetic hand based on the point cloud information of the object"; obtained from KSME Conference, Bioengineering Division, Oral Session A4: Bio-robotics, Apr. 2021.

Luberto, Emanuele, et al.; "Enhancing Adaptive Grasping Through a Simple Sensor-Based Reflex Mechanism"; obtained from IEEE Robotics and Automation Letters, vol. 2, No. 3, Jul. 2017.

Segil, Jacob L., et al.; "Comparative study of state-of-the-art myoelectric controllers for multigrasp prosthetic hands"; obtained from U.S. Department of Veterans Affairs Public Access Author manuscript, Dec. 2015.

Heo, Si-Hwan, et al.; "Shared autonomy for the prosthetic hand based on the point cloud information of the object", Proceedings of the 2021 Spring Conference of the Korean Society of Mechanical Engineers Bioengineering; Korean Society of Mechanical Engineers, Bioengineering Division, Korea, obtained from https://www.dbpia.co.kr/journal/articleDetail?nodeId=NODE10555216; Apr. 2021.

* cited by examiner

ROBOTIC HAND SYSTEM AND METHOD FOR CONTROLLING ROBOTIC HAND

TECHNICAL FIELD

The following description relates to a robotic hand system and a method for controlling a robotic hand.

BACKGROUND ART

In general, a disabled person having a part of the arm that is amputated wears a prosthetic hand on the amputated arm. Such a conventional prosthetic hand, which is simply worn on the arm by a wearing tool, has a short-coming in that it is not possible to provide a gripping force. In order to remedy the short-coming, an invention that provides a gripping force capable of gripping an object with a prosthetic hand by means of an electronic control device is being studied.

There is a method in which a user presses a button corresponding to a desired posture before a prosthetic hand is operated to operate the prosthetic hand so as to correspond thereto, however, there is a problem in that it is non-intuitive because the user has to consciously send individual motion signals. In addition, there is a method of sensing a movement of a muscle of an affected part and operating a prosthetic hand so as to correspond thereto, however, there is a problem in that it is difficult to obtain various motion signals.

Accordingly, there is a need for a robotic prosthetic hand system and method for controlling a robotic prosthetic hand that sense information on a target object to be gripped in real time so as to allow the target object to be automatically gripped.

The above-described background technology is possessed or acquired by the inventor in a derivation process of the present invention, and is not necessarily a known technology disclosed to the general public prior to filing of the present application.

DISCLOSURE OF THE INVENTION

Technical Goals

An aspect provides a robotic hand system and a method for controlling a robotic hand that allow a target object to be efficiently gripped.

Another aspect provides a system and method for controlling a robotic hand having a high success rate of gripping a target object.

Still another aspect provides a system and method for controlling a robotic hand that are operable in an intuitive manner for a user.

Technical Solutions

According to an aspect, there is provided a robotic hand system operated by a user, the robotic hand system including a robotic hand configured to grip a target object, a first sensor unit disposed on the robotic hand, the first sensor unit configured to detect a real-time posture of the robotic hand, a second sensor unit disposed on the robotic hand, the second sensor unit configured to detect three-dimensional surface information of the target object that appears based on the robotic hand, and a processor configured to infer, based on sensing information of the first sensor unit and the second sensor unit, a motion of the robotic hand conforming to an intention of the user, and operate the robotic hand according to the inferred motion. The robotic hand may include a finger module including a plurality of frames, and one or more joint portions connected to the plurality of frames, the one or more joint portions configured to change positions of the plurality of frames.

The processor may be configured to form, based on the sensing information of the first sensor unit and the second sensor unit, a point cloud with respect to a shape of a three-dimensional surface of the target object.

The processor may be configured to determine, based on the point cloud, a relative position of the robotic hand in a relationship with the target object.

The processor may be configured to determine, based on the relative position of the robotic hand, an optimal path for operation of the inferred motion of the robotic hand.

The robotic hand system may further include a machine learning unit configured to receive learning data based on the sensing information of the first sensor unit and the second sensor unit for which the motion of the robotic hand conforming to the intention of the user is known, and perform machine learning on a pattern of the learning data, and an analyzer configured to analyze, using the pre-learned machine learning unit, the motion of the robotic hand conforming to the intention of the user from measurement data based on the sensing information of the first sensor unit and the second sensor unit.

The machine learning unit may include a learning data acquisition unit configured to acquire each learning data according to the sensing information of the first sensor unit and the second sensor unit for which the motion of the robotic hand conforming to the intention of the user is known, a pattern extractor configured to receive each learning data from the learning data acquisition unit, and extract a pattern of each data from each learning data, and a machine learning model generator configured to generate a machine learning model by labeling a motion of the robotic hand conforming to an intention of the user according to sensing information of the first sensor unit and the second sensor unit corresponding to each extracted pattern.

The analyzer may include a pattern matching unit configured to compare the measurement data with the pattern extracted by the pattern extractor, and determine whether the pattern is matched, and a result output unit configured to search for the pattern determined to be matched by the pattern matching unit in the machine learning model, and output, as a result value, a motion of the robotic hand conforming to a corresponding intention of the user.

The processor may be configured to perform feedback control on the robotic hand according to the result value of the result output unit.

The finger module may include a thumb finger portion configured to perform a thumb finger function, an index finger portion configured to perform an index finger function, a middle finger portion configured to perform a middle finger function, a ring finger portion configured to perform a ring finger function, and a little finger portion configured to perform a little finger function.

The thumb finger portion may include two frames and two joint portions, and the index finger portion, the middle finger portion, the ring finger portion, and the little finger portion each may include three frames and three joint portions.

The second sensor unit may be provided in plurality, and each second sensor unit may be disposed on an inner side of each of the thumb finger portion, the index finger portion, the middle finger portion, the ring finger portion, and the little finger portion.

According to another aspect, there is provided a method for controlling a robotic hand, the method including a robotic hand provision step of providing a robotic hand for gripping a target object, a first detection step of detecting a real-time posture of the robotic hand, a second detection step of detecting three-dimensional surface information of the target object that appears based on the robotic hand, a processing step including an operation step of inferring, based on information detected in the first detection step and the second sensor step, a motion of the robotic hand conforming to an intention of a user, and operating the robotic hand according to the inferred motion, a machine learning step of receiving learning data based on the information detected in the first detection step and the second detection step for which the motion of the robotic hand conforming to the intention of the user is known, and performing machine learning on a pattern of the learning data, and an analysis step of analyzing, using a machine learning model pre-learned through the machine learning step, the motion of the robotic hand conforming to the intention of the user from measurement data measured in the first detection step and the second detection step.

The machine learning step may include a learning data acquisition step of acquiring each learning data according to the information detected in the first detection step and the second detection step for which the motion of the robotic hand conforming to the intention of the user is known, a pattern extraction step of extracting a pattern of each data from the learning data acquisition step, and a machine learning model generation step of generating a machine learning model by labeling a motion of the robotic hand conforming to an intention of the user according to information detected in the first detection step and the second detection step corresponding to each extracted pattern.

The analysis step may include a pattern matching step of comparing the measurement data with the pattern extracted in the pattern extraction step, and determining whether the pattern is matched, and a result output step of searching for the pattern determined to be matched in the machine learning model, and outputting, as a result value, a motion of the robotic hand conforming to a corresponding intention of the user.

The processing step may further include a feedback control step of performing feedback control on the robotic hand according to the outputted result value.

Advantageous Effects

A robotic hand system and method for controlling a robotic hand according to an aspect may efficiently grip a target object.

The robotic hand system and method for controlling a robotic hand according to an aspect may grip the target object with high probability.

The robotic hand system and method for controlling a robotic hand according to an aspect may be operated in an intuitive manner for a user.

Effects of the robotic hand system and method for controlling a robotic hand according to an aspect are not limited to those mentioned above, and other effects not mentioned will be clearly understood by those skilled in the art from the following description.

BRIEF DESCRIPTION OF DRAWINGS

The following drawings attached to the present specification illustrate preferred example embodiments of the present invention, and serve to provide further understanding of the technical spirit of the present invention together with the detailed description of the invention, so that the present invention is not construed as being limited to the drawings.

BEST MODE FOR CARRYING OUT THE INVENTION

Figure 1:
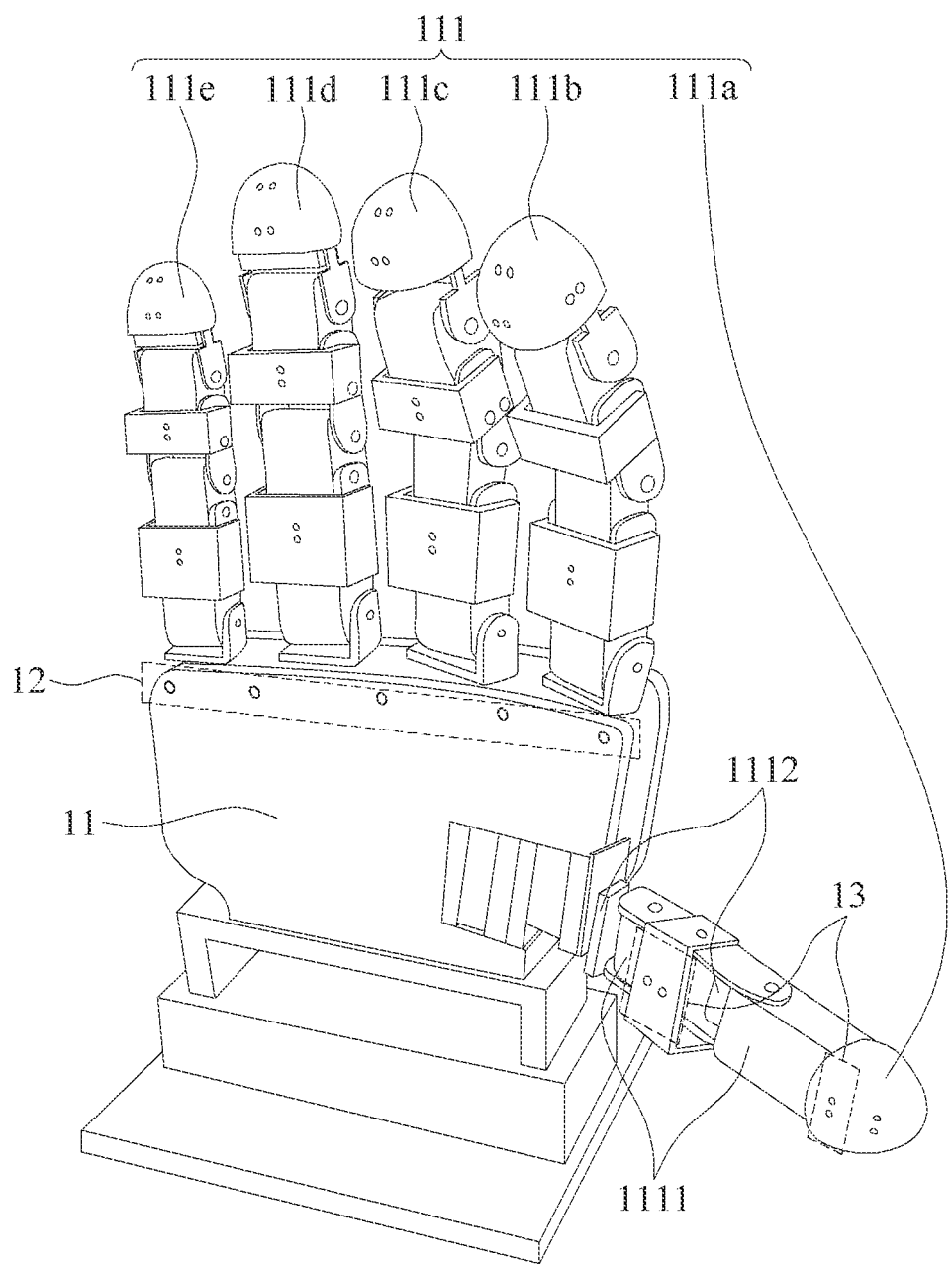
FIG. 1 is a perspective view illustrating a robotic hand system according to an example embodiment.

Hereinafter, example embodiments are described in detail with reference to the accompanying drawings. Various modifications may be made to the example embodiments. The example embodiments are not construed as being limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

In addition, when describing the example embodiments with reference to the accompanying drawings, like reference numerals refer to like components and a repeated description related thereto will be omitted. When describing the example embodiments, detailed description of well-known related structures or functions will be omitted when it is deemed that such description will cause ambiguous interpretation of the example embodiments.

In addition, it will be understood that, although the terms first, second, A, B, (a), (b), and the like may be used herein to describe various components of the example embodiments, these terms are only used to distinguish one component from another component and essential, order, or sequence of corresponding components are not limited by these terms. It will be understood that when one component is referred to as being "connected to," "coupled to," or "linked to" another component, one component may be "connected to," "coupled to," or "linked to" another component via a further component although one component may be directly connected to or directly linked to another component.

The same name may be used to describe a component included in an example embodiment and a component having a common function in another example embodiment. Unless otherwise mentioned, the description on the example embodiment may be applicable to the other example embodiment and thus, duplicated description will be omitted for conciseness.

Figure 2A:
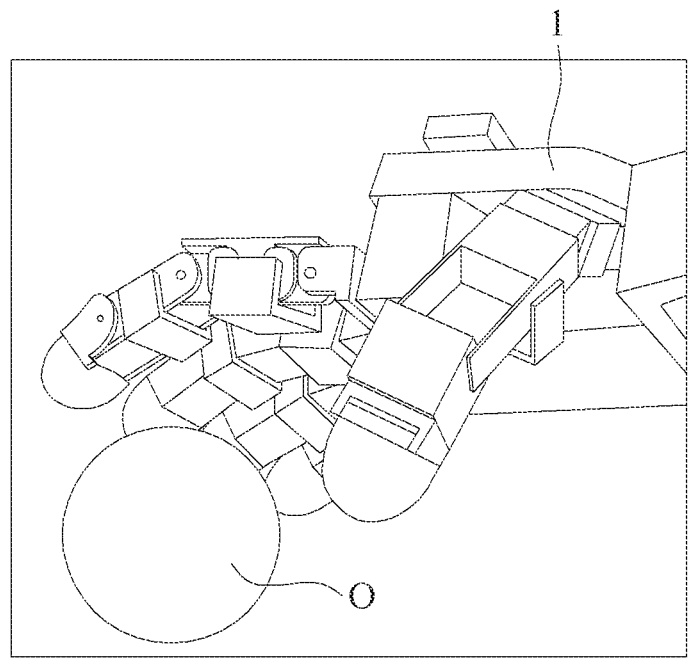
FIGS. 2A and 2B are diagrams illustrating an operating principle of a robotic hand according to an example embodiment.
Figure 2B:
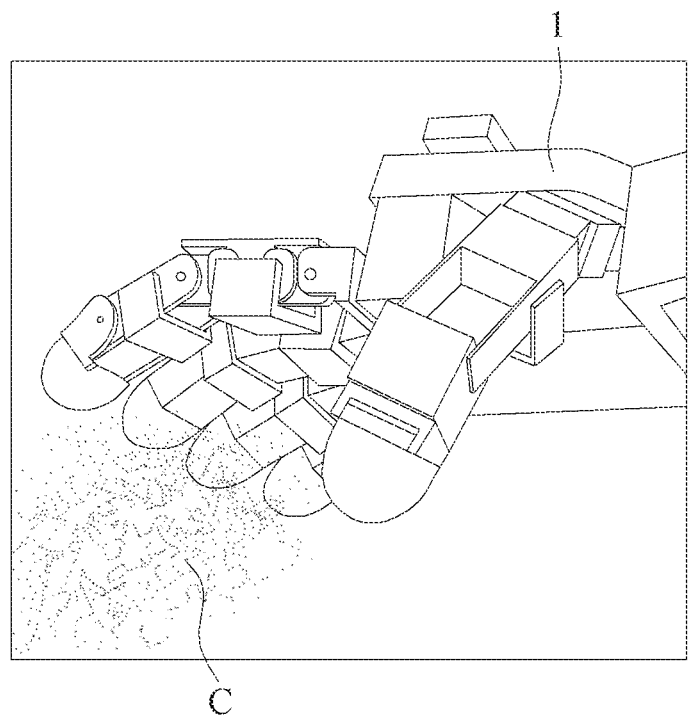
Figure 3A:
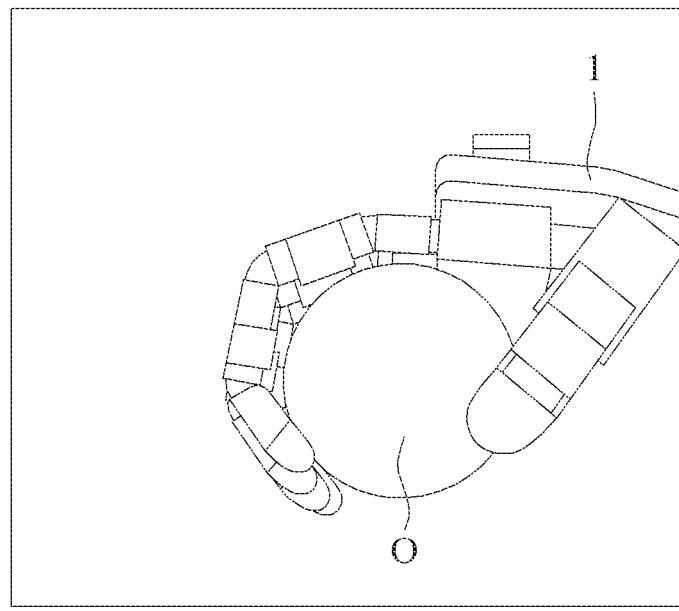
FIGS. 3A and 3B are diagrams illustrating a motion of a robotic hand according to an example embodiment.
Figure 3B:
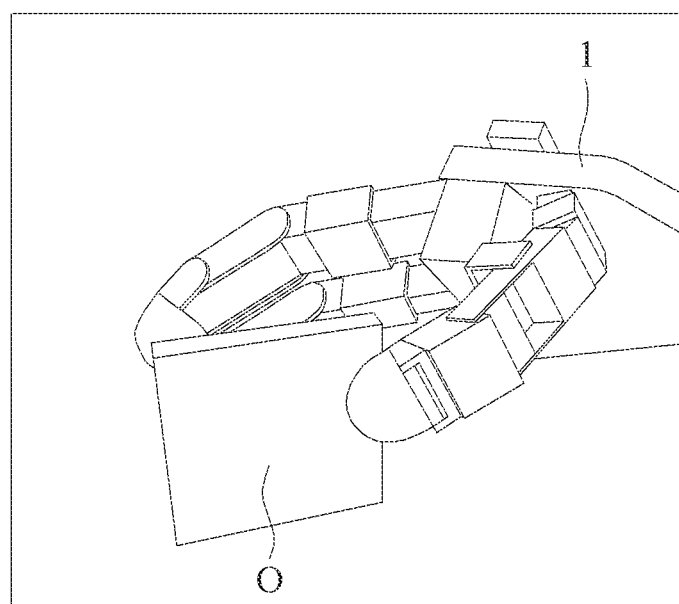
Figure 4:
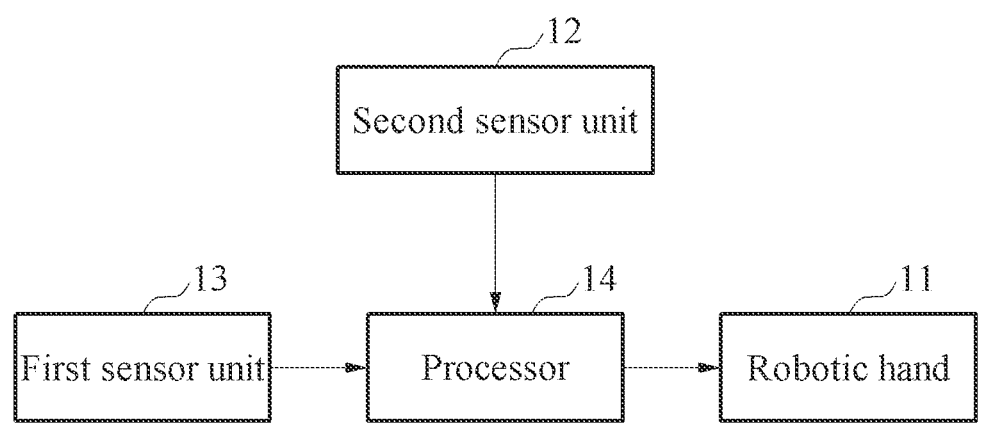
FIG. 4 is a block diagram illustrating a robotic hand system according to an example embodiment.

FIG. 1 is a perspective view illustrating a robotic hand system 1 according to an example embodiment, FIGS. 2A and 2B are diagrams illustrating an operating principle of the robotic hand 11 according to an example embodiment, FIGS. 3A and 3B are diagrams illustrating a motion of the robotic hand 11 according to an example embodiment, and FIG. 4 is a block diagram illustrating the robotic hand system 1 according to an example embodiment.

Referring to FIGS. 1 to 4, the robotic hand system 1 according to an example embodiment may infer a motion of the robotic hand 11 conforming to an intention of a user, and operate the robotic hand 11 according to the inferred motion. In an example embodiment, the robotic hand system 1 may include a robotic hand 11, a first sensor unit 12, a second sensor unit 13, and a processor 14.

The robotic hand 11 may grip a target object O. In an example embodiment, the robotic hand 11 may include a finger module 111, and the finger module 111 may include a plurality of frames 1111 and one or more joint portions 1112. The joint portion 1112 may be connected to the plurality of frames 1111, and may change positions of the plurality of frames 1111. For example, the frame 1111 may be formed in a structure having a longitudinal direction. For example, the joint portion 1112 may include one or more motors, and the position of the frame 1111 may be changed by rotation of the motor. For example, the robotic hand 11 may function as a robotic prosthetic hand or industrial tongs. However, the above description is an example, and the function of the robotic hand is not limited thereto. In an example embodiment, the robotic hand system 1 may be applied to various scales of use. For example, the robotic hand system 1 may be applied to tip tongs of a heavy-duty crane, and the like.

In an example embodiment, the finger module 111 may include a thumb finger portion 111a that performs a thumb finger function, an index finger portion 111b that performs an index finger function, a middle finger portion 111c that performs a middle finger function, a ring finger portion 111d that performs a ring finger function, and a little finger portion 111e that performs a little finger function. The thumb finger portion 111a may include two frames 1111 and two joint portions 1112. In addition, the index finger portion 111b, the middle finger portion 111c, the ring finger portion 111d, and the little finger portion 111e each may include three frames 1111 and three joint portions 1112. For example, the thumb finger portion 111a may be formed so as to have a length in a longitudinal direction shorter than those of the index finger portion 111b, the middle finger portion 111c, the ring finger portion 111d, and the little finger portion 111e.

The first sensor unit 12 may be disposed on the robotic hand 11, and may detect a real-time posture of the robotic hand 11. In an example embodiment, the first sensor unit 12 may detect the real-time posture of the robotic hand 11 in a manner of tracking a position of the second sensor unit 13 to be described later. For example, the first sensor unit 12 may be disposed on an inner side of the robotic hand 11. Here, the inner side refers to a position where a palm is formed, that is, a position formed on a back surface of the back of a hand. However, the above description is an example, and arrangement of the first sensor unit is not limited thereto.

The second sensor unit 13 may be disposed on the robotic hand 11, and may detect three-dimensional surface information of the target object O that appears based on the robotic hand 11. In an example embodiment, the second sensor unit 13 may be provided in plurality. Each second sensor unit 13 may be disposed on an inner side of each of the thumb finger portion 111a, the index finger portion 111b, the middle finger portion 111c, the ring finger portion 111d, and the little finger portion 111e. Here, the inner side refers to a position where a palm is formed, that is, a position formed on a back side of the back of a hand. The second sensor unit 13 may detect the three-dimensional surface information of the target object O without obstruction of a field of view, while the thumb finger portion 111a, the index finger portion 111b, the middle finger portion 111c, the ring finger portion 111d, and the little finger portion 111e surround the target object O.

The processor 14 may infer, based on sensing information of the first sensor unit 12 and the second sensor unit 13, a motion of the robotic hand 11 conforming to the intention of the user, and may operate the robotic hand 11 according to the inferred motion. Since the processor 14 does not go through an image processing process, a computational complexity may be reduced, thereby remarkably improving a computation speed.

In FIGS. 2A and 2B, in an example embodiment, the processor 14 may form, based on the sensing information of the first sensor unit 12 and the second sensor unit 13, a point cloud C with respect to a shape of a three-dimensional surface of the target object O. In an example embodiment, the processor 14 may determine, based on the point cloud C, a relative position of the robotic hand 11 in a relationship with the target object O. The processor 14 may determine, based on the relative position of the robotic hand 11, an optimal path for operation of the inferred motion of the robotic hand 11.

In FIGS. 3A and 3B, the processor 14 may operate, based on the sensing information of the first sensor unit 12 and the second sensor unit 13, the robotic hand 11 so as to conform to the intention of the user. For example, when the target object O enters deep within the robotic hand 11, the processor 14 may operate the robotic hand 11 so as to grip the target object O using the entire palm of the robotic hand 11, while the finger module 111 surrounds the target object O (for example, FIG. 3A). In addition, for example, when the target object O is positioned adjacent to an end of the finger module 111, the processor 14 may operate the robotic hand 11 so as to grip the target object O using the end of the finger module 111 (for example, FIG. 3B).

Figure 5:
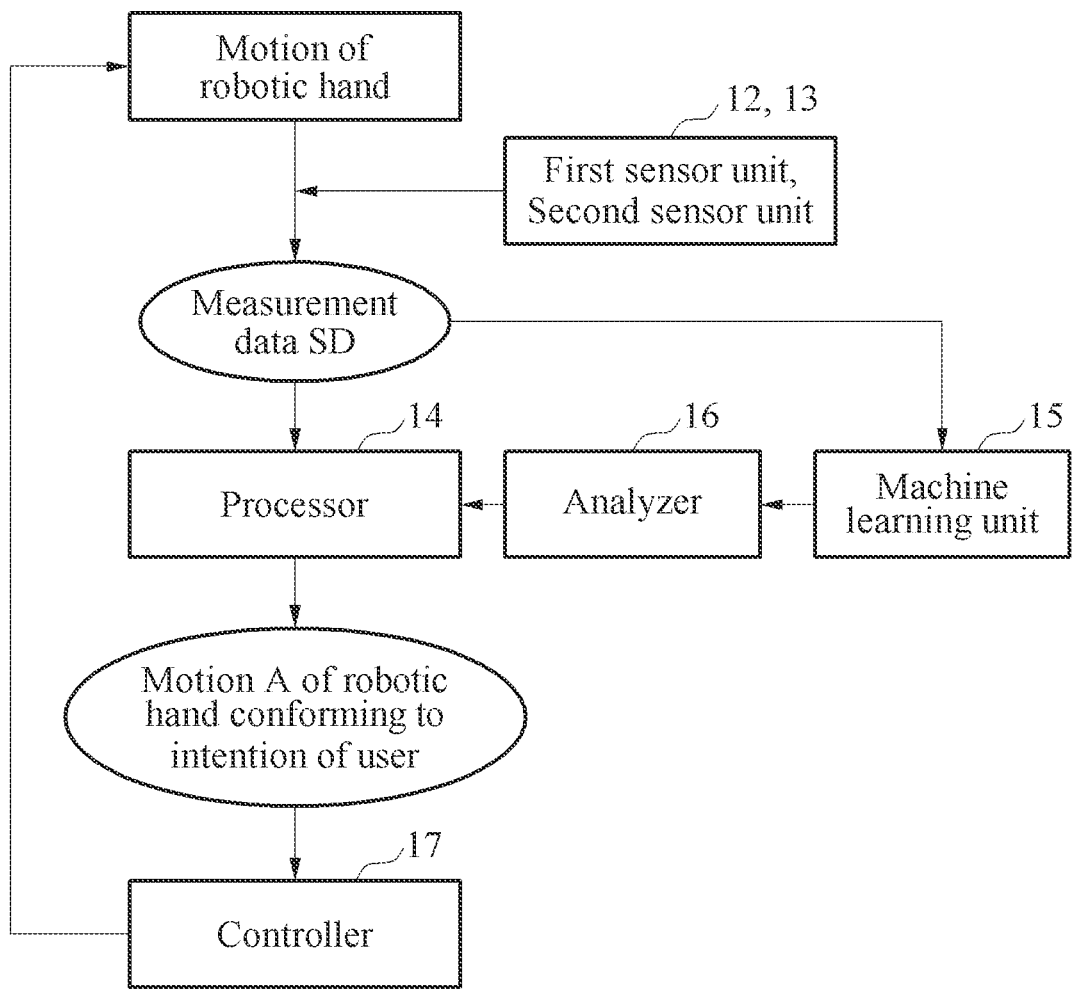
FIG. 5 is a block diagram illustrating a robotic hand system according to an example embodiment.
Figure 6:
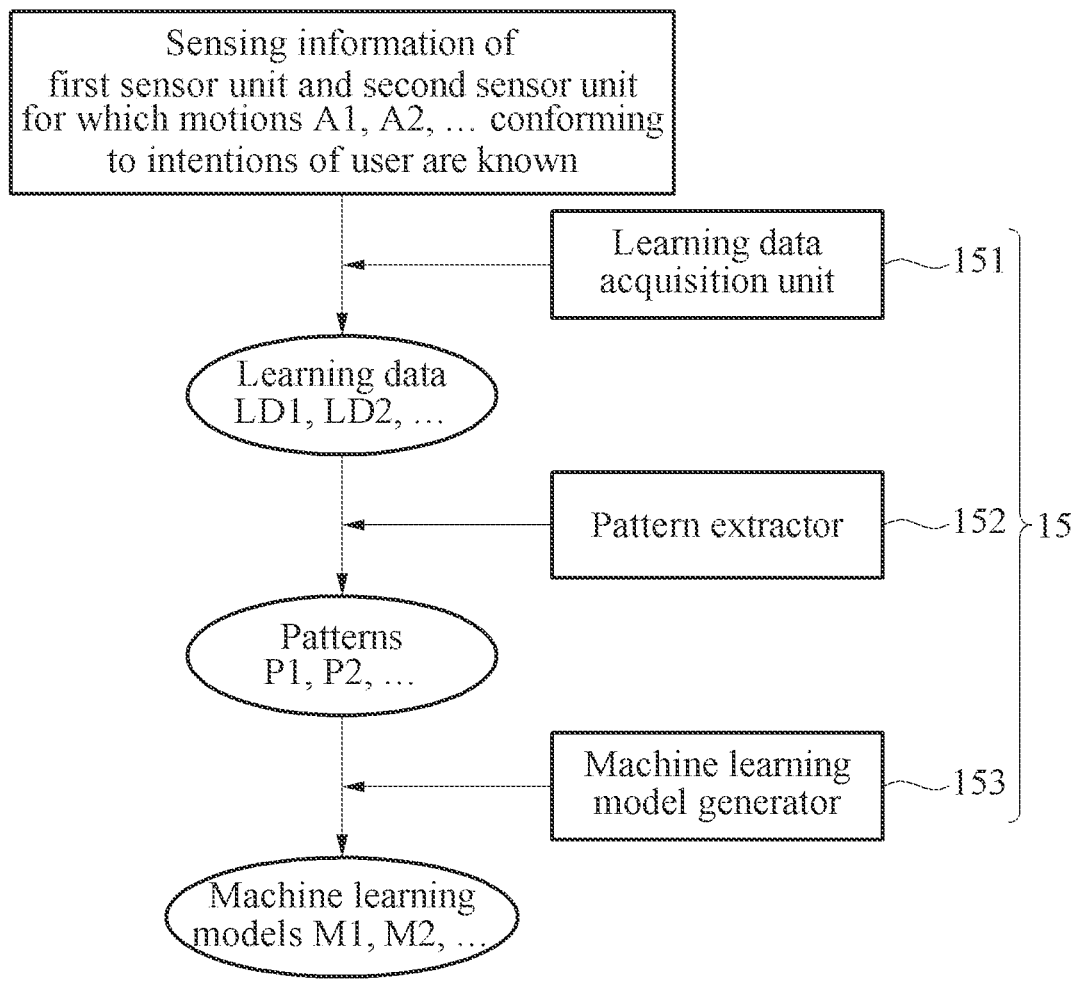
FIG. 6 is a block diagram illustrating a machine learning unit of a robotic hand system according to an example embodiment.
Figure 7:
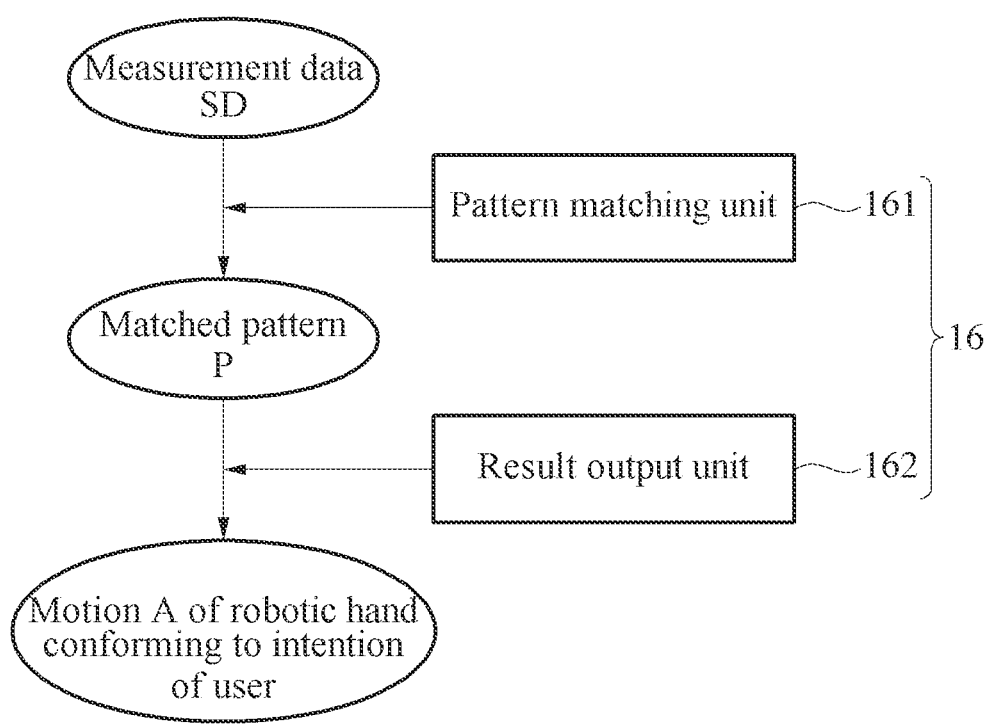
FIG. 7 is a block diagram illustrating an analyzer of a robotic hand system according to an example embodiment.

FIG. 5 is a block diagram illustrating the robotic hand system 1 according to an example embodiment, FIG. 6 is a block diagram illustrating a machine learning unit 15 of the robotic hand system 1 according to an example embodiment, and FIG. 7 is a block diagram illustrating an analyzer 16 of the robotic hand system 1 according to an example embodiment.

Referring to FIGS. 5 to 7, a robotic hand system (for example, the robotic hand system 1 in FIG. 1) according to an example embodiment may diagnose a motion A of a robotic hand conforming to an intention of a user using machine learning. In an example embodiment, the robotic hand system 1 may further include a machine learning unit 15, an analyzer 16, and a controller 17.

The robotic hand system 1 may learn a pattern P according to the motion A of the robotic hand conforming to the intention of the user through machine learning from learning data LD based on a first sensor unit (for example, the first sensor unit 12 in FIG. 1) and a second sensor unit (for example, the second sensor unit 13 in FIG. 1) for which a motion of the robotic hand conforming to the intention of the user is known. The robotic hand system 1 may compare measurement data SD based on the sensing information of the first sensor unit 12 and the second sensor unit 13 with the pre-learned pattern P, and determine whether the pattern P is matched, and may determine a motion of the robotic hand corresponding to the matched pattern P as the motion A of the robotic hand conforming to the intention of the user. The robotic hand system 1 may operate the robotic hand 11 so as to conform to the intention of the user through feedback control that corrects the robotic hand (for example, the robotic hand 11 in FIG. 1) according to the motion A of the robotic hand conforming to the determined intention of the user.

The machine learning unit 15 may receive the learning data LD based on sensing information of the first sensor unit 12 and the second sensor unit 13 for which the motion of the robotic hand conforming to the intention of the user is known, and perform machine learning on the pattern P of the learning data LD. That is, the machine learning unit 15 may learn the pattern P of data generated according to the motion A of the robotic hand conforming to the intention of the user through supervised learning. Machine learning of the machine learning unit 15 may be pre-performed before a process is performed.

The machine learning unit 15 may include a learning data acquisition unit 151, a pattern extractor 152, and a machine learning model generator 153.

The learning data acquisition unit 151 may acquire each learning data LD according to the sensing information of the first sensor unit 12 and the second sensor unit 13 for which the motion A of the robotic hand conforming to the intention of the user is known. The learning data LD may be acquired for each motion A of the robotic hand conforming to an intention of each user. For example, data based on the sensing information of the first sensor unit 12 and the second sensor unit 13 having a first motion A1 may be acquired as first learning data LD1, and data based on the sensing information of the first sensor unit 12 and the second sensor unit 13 having a second motion A2 may be acquired as second learning data LD2. The learning data acquisition unit 151 may acquire data measured through a pre-experiment or acquire data from a database.

The pattern extractor 152 may receive each learning data LD from the learning data acquisition unit 151. In the learning data LD sensed in a specific motion, a specific pattern P may be formed on the data due to the specific motion. The pattern extractor 152 may extract a pattern P of each data from each received learning data LD. The pattern P may be extracted for each learning data LD. For example, the pattern extractor 152 may extract a first pattern P1 from the first learning data LD1 and extract a second pattern P2 from the second learning data LD2. For example, the pattern extractor 152 may extract the pattern P by performing FFT processing on the learning data LD. Extraction of the pattern P by the pattern extractor 152 may be performed through machine learning from a plurality of pieces of learning data LD based on the sensing information of the first sensor unit 12 and the second sensor unit 13 having the same motion.

The machine learning model generator 153 may generate a machine learning model M by labeling the motion A of the robotic hand conforming to the intention of the user according to the sensing information of the first sensor unit 12 and the second sensor unit 13 corresponding to the extracted pattern P. That is, for each specific pattern P, the motion A of the robotic hand conforming to the corresponding intention of the user may be labeled and stored as the machine learning model M. The machine learning model M may include information indicating that a specific pattern P appears in data sensed in a specific motion, that is, information indicating that the robotic hand 11 operates with a specific motion when the specific pattern P appears in the sensed data. For example, information on the first pattern P1 and the first motion A1 corresponding to the first pattern P1 may be stored in a first machine learning model M1, and information on the second pattern P2 and the second motion A2 corresponding to the second pattern P2 may be stored in a second machine learning model M2.

The analyzer 16 may analyze the motion A of the robotic hand conforming to the intention of the user from the measurement data SD based on the sensing information of the first sensor unit 12 and the second sensor unit 13, using the pre-learned machine learning unit 15. The analyzer 16 may compare the measurement data SD with the pre-learned pattern P, and determine a motion of the robotic hand corresponding to the matched pattern P as the motion A of the robotic hand conforming to the intention of the user.

The analyzer 16 may include a pattern matching unit 161 and a result output unit 162.

The pattern matching unit 161 may compare the measurement data SD with the pattern P extracted by the pattern extractor 152, and determine whether the pattern P is matched. That is, the pattern matching unit 161 may determine the pattern P matching the measurement data SD. There may be a plurality of patterns P matching the measurement data SD. For example, the pattern matching unit 161 may determine whether the pattern P is matched by performing FFT processing on the measurement data SD. An operation of matching the measurement data SD with the pre-learned pattern P by the pattern matching unit 161 may be performed through machine learning.

The result output unit 162 may search for the pattern P determined to be matched by the pattern matching unit 161 in the machine learning model M, and output a motion of the robotic hand as a result value. That is, the result output unit 162 may output a motion of the robotic hand corresponding to the pattern P matching the measurement data SD as the motion A of the robotic hand conforming to the intention of the user.

The processor (for example, the processor 14 in FIG. 4) may perform feedback control on the motion of the robotic hand according to the result value of the result output unit 162. The processor 14 may correct and control the motion of the robotic hand so as to supplement the motion of the robotic hand. According to such feedback control, by correcting and controlling the motion of the robotic hand in real time according to the sensing information of the first sensor unit 12 and the second sensor unit 13, the robotic hand 11 may be operated so as to conform to the intention of the user.

The controller 17 may receive the motion of the robotic hand 11 according to the intention of the user. The controller 17 may perform feedback control on the motion of the robotic hand 11 according to the motion A of the robotic hand conforming to the above-inferred intention of the user and a motion of the robotic hand 11 inputted through a controller.

Figure 8:
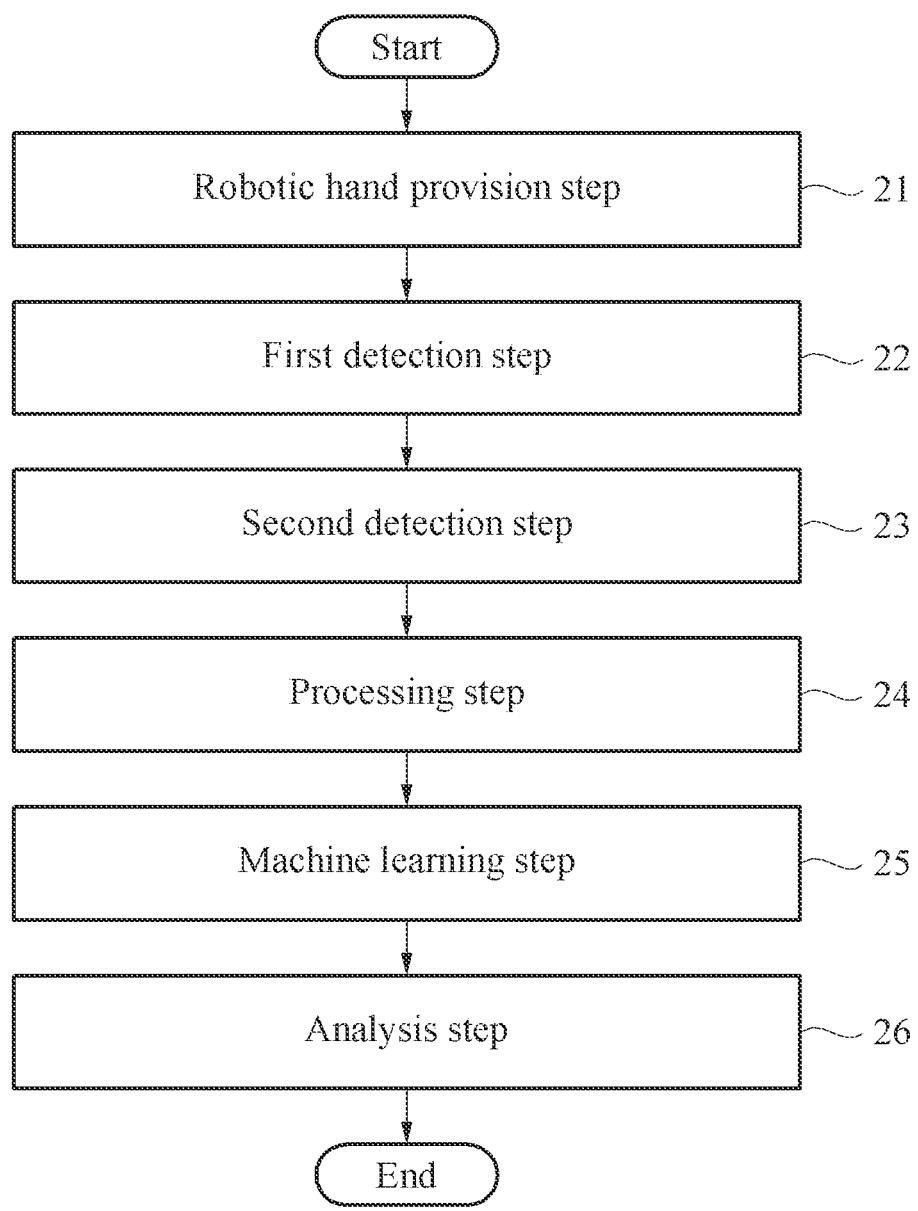
FIG. 8 is a flowchart illustrating a robotic hand control method according to an example embodiment.
Figure 9:
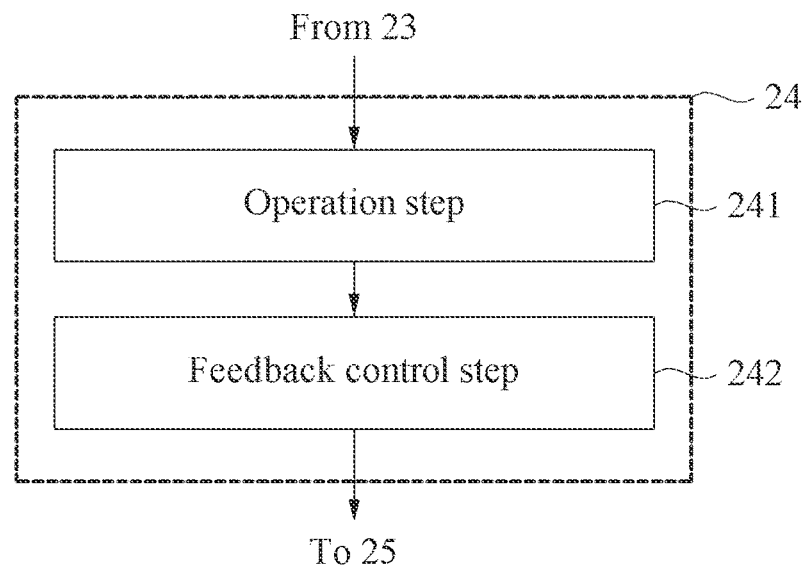
FIG. 9 is a flowchart illustrating a machine learning step for a robotic hand control method according to an example embodiment.
Figure 10:
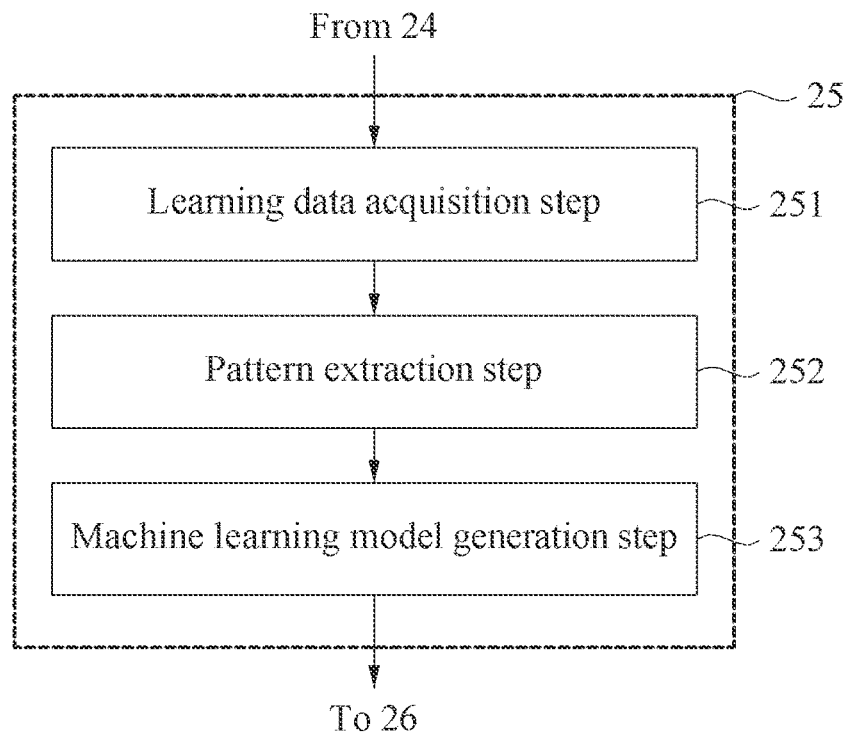
FIG. 10 is a flowchart illustrating an analysis step for a robotic hand control method according to an example embodiment.
Figure 11:
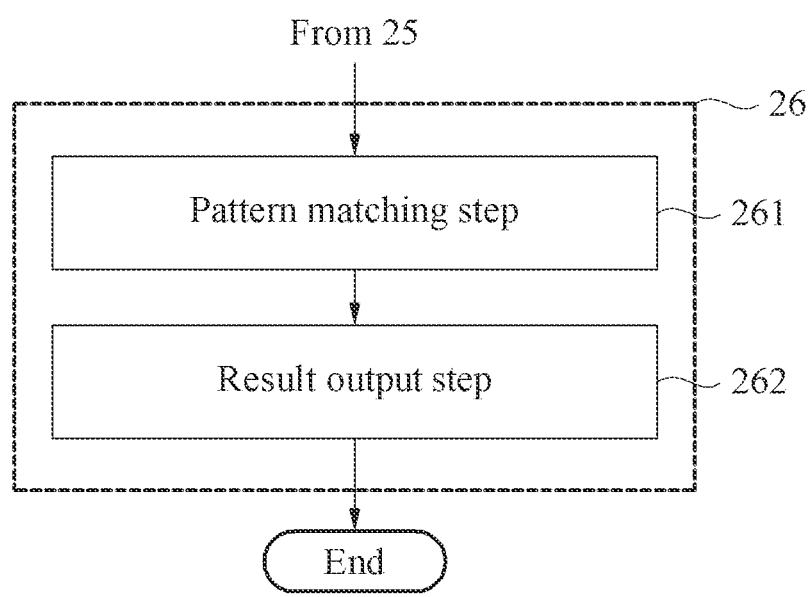
FIG. 11 is a flowchart illustrating a processing step for a robotic hand control method according to an example embodiment.

FIG. 8 is a flowchart illustrating a robotic hand control method 2 according to an example embodiment, FIG. 9 is a flowchart illustrating a machine learning step 25 for the robotic hand control method 2 according to an example embodiment, FIG. 10 is a flowchart illustrating an analysis step 26 for the robotic hand control method 2 according to an example embodiment, and FIG. 11 is a flowchart illustrating a processing step 24 for the robotic hand control method 2 according to an example embodiment.

Referring to FIGS. 8 to 11, the robotic hand control method 2 according to an example embodiment may diagnose a motion of a robotic hand conforming to an intention of a user using machine learning, and may perform feedback control on a mechanism portion according to a simple motion intention of a user inputted through a short-channel myopotential signal and the like, and the diagnosed necessary motion. In an example embodiment, the robotic hand control method 2 may include a robotic hand provision step 21, a first detection step 22, a second detection step 23, the processing step 24, the machine learning step 25, and the analysis step 26.

In describing the robotic hand control method 2 with reference FIGS. 8 and 9, a description overlapping the above description will be omitted.

The robotic hand provision step 21 may be a step of providing a robotic hand for gripping a target object. The first detection step 22 may be a step of detecting a real-time posture of the robotic hand. The second detection step 23 may be a step of detecting three-dimensional surface information of the target object that appears based on the robotic hand.

The processing step 24 may be a step including an operation step 241 of inferring, based on information detected in the first detection step 22 and the second detection step 23, a motion of the robotic hand conforming to an intention of a user, and operating the robotic hand according to the inferred motion. In an example embodiment, the processing step 24 may further include a feedback control step 242 of performing feedback control on the robotic hand according to an outputted result value.

The machine learning step 25 may be a step of receiving learning data based on the information detected in the first detection step 22 and the second detection step 23 for which the motion of the robotic hand conforming to the intention of the user is known, and performing machine learning on a pattern of the learning data. In an example embodiment, the machine learning step 25 may include a learning data acquisition step 251, a pattern extraction step 252, and a machine learning model generation step 253.

In an example embodiment, the learning data acquisition step 251 may be a step of acquiring each learning data according to the information detected in the first detection step 22 and the second detection step 23 for which the motion of the robotic hand conforming to the intention of the user is known. The pattern extraction step 252 may be a step of extracting a pattern of each data from the learning data acquisition step 251. The machine learning model generation step 253 may be a step of generating a machine learning model by labeling the motion of the robotic hand conforming to the intention of the user according to the information detected in the first detection step 22 and the second detection step 23 corresponding to each extracted pattern.

The analysis step 26 may be a step of analyzing the motion of the robotic hand conforming to the intention of the user from measurement data, using the machine learning model pre-learned through the machine learning step 25. In an example embodiment, the analysis step 26 may include a pattern matching step 261 and a result output step 262.

In an example embodiment, the pattern matching step 261 may be a step of comparing the measurement data with the pattern extracted in the pattern extraction step 252, and determining whether the pattern is matched. The result output step 262 may be a step of searching for the pattern determined to be matched in the machine learning model, and outputting, as a result value, a motion of the robotic hand conforming to a corresponding intention of the user.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

The invention claimed is:

1. A robotic hand system operated by a user, the robotic hand system comprising:
   a robotic hand configured to grip a target object;
   a first sensor unit disposed on the robotic hand, the first sensor unit configured to detect a real-time posture of the robotic hand;
   a plurality of second sensor units each disposed on a respective finger module of a plurality of finger modules of the robotic hand, wherein the plurality of second sensor units are configured to detect three-dimensional surface information of the target object relative to the robotic hand without requiring physical contact between the robotic hand and the target object; and
   a processor configured to:
      infer a motion path of the robotic hand to reach and grip the target object based on the real-time posture detected by the first sensor unit and the three-dimensional surface information detected by the plurality of second sensor units, wherein the processor is configured to infer the motion path independent of input by the user;
      receive a signal indicating a motion intention of the user; and
      operate the robotic hand according to the motion path to reach and grip the target object using the robotic hand; and
   wherein the robotic hand comprises the plurality of finger modules comprising:

a plurality of frames; and
one or more joint portions connected to the plurality of frames, the one or more joint portions configured to change positions of the plurality of frames.

2. The robotic hand system of claim 1, wherein the processor is configured to form a point cloud of a shape of a three-dimensional surface of the target object relative to the robotic hand based on the real-time posture detected by the first sensor unit and the three-dimensional surface information detected by the plurality of second sensor units.

3. The robotic hand system of claim 2, wherein the processor is configured to determine a relative position between the robotic hand and the target object based on the point cloud.

4. The robotic hand system of claim 3, wherein the processor is configured to determine an optimal motion trajectory of the robotic hand to reach and grip the target object based on the relative position between the robotic hand and the target object.

5. The robotic hand system of claim 1, further comprising:
a machine learning unit configured to receive one or more learning data sets, wherein each respective learning data set includes known posture data, known three-dimensional surface data, and a known motion path of the robotic hand that corresponds with the known posture data and the known three-dimensional surface data of the respective learning data set, and wherein the machine learning unit is configured to train a machine learning model on the one or more learning data sets; and
an analyzer configured to output, using the machine learning unit, the known motion path of the robotic hand based on input measurement data including the real-time posture detected by the first sensor unit and the three-dimensional surface information of the target object detected by the plurality of second sensor units.

6. The robotic hand system of claim 5, wherein the machine learning unit comprises:
a learning data acquisition unit configured to acquire each learning data set;
a pattern extractor configured to receive each learning data set from the learning data acquisition unit, and extract a pattern from each respective learning data set; and
a machine learning model generator configured to generate a machine learning model by labeling the known motion path of the robotic hand of each respective learning data set as corresponding with the pattern extracted from the respective learning data set.

7. The robotic hand system of claim 6, wherein the analyzer comprises:
a pattern matching unit configured to compare the input measurement data with each of the patterns extracted by the pattern extractor from each of the one or more learning data sets, and determine whether the input measurement data matches any of the patterns; and
a result output unit, wherein in response to the pattern matching unit determining the input measurement data matches one of the patterns, the result output unit is configured to output, as a result value, the known motion path of the robotic hand that corresponds with the pattern that matches the input measurement data.

8. The robotic hand system of claim 7, wherein the processor is configured to perform feedback control on the robotic hand according to the result value of the result output unit.

9. The robotic hand system of claim 1, wherein the plurality of finger modules comprises:
a thumb finger portion configured to perform a thumb finger function;
an index finger portion configured to perform an index finger function;
a middle finger portion configured to perform a middle finger function;
a ring finger portion configured to perform a ring finger function; and
a little finger portion configured to perform a little finger function.

10. The robotic hand system of claim 9, wherein
the thumb finger portion comprises two frames and two joint portions, and
the index finger portion, the middle finger portion, the ring finger portion, and the little finger portion each comprise three frames and three joint portions.

11. The robotic hand system of claim 10, wherein
the plurality of second sensor units are disposed on an inner side of each of the thumb finger portion, the index finger portion, the middle finger portion, the ring finger portion, and the little finger portion.

12. A method for controlling a robotic hand, the method comprising:
detecting a real-time posture of the robotic hand using a first sensor disposed on the robotic hand;
detecting three-dimensional surface information of a target object relative to the robotic hand using a plurality of second sensors each disposed on a respective finger module of the robotic hand when the robotic hand and the target object are physically spaced apart from each other;
inferring a motion path of the robotic hand to reach and grip the target object based on the real-time posture detected by the first sensor and the three-dimensional surface information detected by the plurality of second sensors, wherein the motion path is inferred independent of input from a user;
receiving an input signal indicating a motion intention of a user; and
operating the robotic hand according to the motion path to reach and grip the target object using the robotic hand.

13. The method of claim 12, further comprising:
acquiring one or more learning data sets, wherein each respective learning data set includes a known posture of the robotic hand, known three-dimensional surface information, and a known motion path of the robotic hand that corresponds with the known posture and the known three-dimensional surface information of the respective learning data set;
extracting a pattern from each respective learning data set; and
generating a machine learning model by labeling the known motion path of the robotic hand of each respective learning data set as corresponding with the pattern extracted from the respective learning data set.

14. The method of claim 13, further comprising:
comparing measurement data including the real-time posture detected using the first sensor and the three-dimensional surface information of the target object detected using the plurality of second sensors with the patterns extracted from each of the one or more learning data sets and determining whether the measurement data matches any of the patterns; and
in response to determining that the measurement data matches one of the patterns, outputting, as a result value, the known motion path of the robotic hand that corresponds with the pattern that matches the measurement data.

15. The method of claim 14, further comprising performing feedback control on the robotic hand according to the known motion path output as the result value.

16. The method of claim 12, further comprising:
receiving learning data including known posture data, known three-dimensional surface data, and a known motion path of the robotic hand conforming to the motion intention of the user that corresponds with the known posture data and the known three-dimensional surface data, and training a machine learning model on a pattern of the learning data; and
outputting, using the machine learning model, the known motion path of the robotic hand conforming to the motion intention of the user based on input measurement data including the real-time posture detected using the first sensor and the three-dimensional surface information of the target object detected using the plurality of second sensors.

17. The robotic hand system of claim 1, wherein the first sensor unit is configured to detect the real-time posture of the robotic hand by tracking a position of the plurality of second sensor units disposed on the robotic hand.

18. The robotic hand system of claim 1, wherein the signal indicating the motion intention of the user comprises a myopotential signal.

19. The method of claim 12, wherein the input signal comprises a myopotential signal.

20. The method of claim 12, further comprising:
forming a point cloud of a shape of a three-dimensional surface of the target object relative to the robotic hand based on the real-time posture and the three-dimensional surface information;
determining a relative position between the robotic hand and the target object based on the point cloud; and
determining an optimal motion trajectory for operation of the robotic hand according to the inferred motion path based on the relative position between the robotic hand and the target object.

* * * * *